(12) United States Patent
Weiberle et al.

(10) Patent No.: US 7,890,800 B2
(45) Date of Patent: Feb. 15, 2011

(54) METHOD, OPERATING SYSTEM AND COMPUTING HARDWARE FOR RUNNING A COMPUTER PROGRAM

(75) Inventors: Reinhard Weiberle, Vaihingen-Enz (DE); Bernd Mueller, Gerlingen (DE); Werner Harter, Illingen (DE); Thomas Kottke, Ehningen (DE); Yorck von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 11/659,307

(22) PCT Filed: Jul. 25, 2005

(86) PCT No.: PCT/EP2005/053621

§ 371 (c)(1),
(2), (4) Date: Dec. 5, 2008

(87) PCT Pub. No.: WO2006/015945

PCT Pub. Date: Feb. 16, 2006

(65) Prior Publication Data

US 2009/0217090 A1 Aug. 27, 2009

(30) Foreign Application Priority Data

Aug. 4, 2004 (DE) .................. 10 2004 037 713

(51) Int. Cl.
G06F 11/00 (2006.01)
(52) U.S. Cl. .................. 714/15; 714/16; 714/17
(58) Field of Classification Search .................. None
See application file for complete search history.

(56) References Cited

U.S. PATENT DOCUMENTS 4,852,092 A * 7/1989 Makita .................. 714/17

(Continued)

FOREIGN PATENT DOCUMENTS

CA 2 365 427 6/2003

(Continued)

OTHER PUBLICATIONS

Huang et al., *Components for Software Fault Tolerance and Rejuvenation*, Bell Labs Technical Journal, Wiley, CA, vol. 75, No. 2, Apr. 1996, pp. 29-37.

Primary Examiner—Christopher S McCarthy
(74) Attorney, Agent, or Firm—Kenyon & Kenyon LLP

(57) ABSTRACT

A method for running a computer program on computing hardware, in particular on a microprocessor. The computer program includes multiple program objects designed as tasks, for example. Transient and permanent errors are detected during the running of the computer program on the computing hardware. To be able to handle these transient errors constructively when they occur in a computer system in such a way that the functionality and function reliability of the computer system are restored within the shortest possible error tolerance time, at least one program object that has already been sent for execution is set into a defined state on detection of an error and is restarted from this state. The program object is a runtime object of the computer program, for example, also known as a task. One or more tasks that are still being executed or have already been executed on occurrence of an error are restarted and run again.

20 Claims, 2 Drawing Sheets

U.S. PATENT DOCUMENTS

| | | |
|---|---|---|
| 5,911,040 A | 6/1999 | Hirayama et al. |
| 5,923,832 A * | 7/1999 | Shirakihara et al. ............ 714/37 |
| 6,105,148 A * | 8/2000 | Chung et al. .................. 714/16 |
| 6,839,868 B1 | 1/2005 | Pignol |
| 7,206,964 B2 * | 4/2007 | Moser et al. .................. 714/13 |
| 7,412,520 B2 * | 8/2008 | Sun ........................... 709/227 |
| 7,516,361 B2 * | 4/2009 | Vick et al. .................... 714/15 |
| 7,634,687 B2 * | 12/2009 | Haselden et al. .............. 714/15 |
| 2001/0042224 A1* | 11/2001 | Stanfill et al. ................. 714/16 |
| 2002/0188653 A1* | 12/2002 | Sun ........................... 709/201 |
| 2003/0088807 A1 | 5/2003 | Mathiske et al. |
| 2004/0153763 A1* | 8/2004 | Grochowski et al. .......... 714/17 |
| 2005/0034014 A1* | 2/2005 | Moser et al. .................. 714/17 |
| 2005/0283665 A1* | 12/2005 | Levering et al. .............. 714/21 |

FOREIGN PATENT DOCUMENTS

| | | |
|---|---|---|
| EP | 1 164 590 | 12/2001 |
| EP | 1 121 642 | 2/2003 |
| GB | 2 326 254 | 12/1998 |
| JP | 1-103306 | 4/1989 |
| WO | 00 75923 | 12/2000 |

* cited by examiner

METHOD, OPERATING SYSTEM AND COMPUTING HARDWARE FOR RUNNING A COMPUTER PROGRAM

FIELD OF THE INVENTION

The present invention relates to a method for running a computer program on computing hardware, in particular on a microprocessor. The computer program includes multiple program objects. In this method, errors are detected during the running of the computer program on the computing hardware. The present invention also relates to an operating system capable of running on computing hardware, in particular on a microprocessor. Finally, the present invention also relates to a computing hardware for running a computer program including multiple program objects. The computing hardware has an error detection mechanism for detecting an error during the running of the computer program on the computing hardware.

BACKGROUND INFORMATION

So-called transient errors may occur in running a computer program on computing hardware. Since the structures on semiconductor modules (so-called chips) are becoming progressively smaller, but the clock rates of the signals are becoming progressively higher and the signal voltages are becoming progressively lower, there is an increased incidence of transient errors. Transient errors occur only temporarily, in contrast with permanent errors, and usually disappear spontaneously after a period of time. In transient errors, only individual bits are faulty and there is no permanent damage to the computing hardware. Transient errors may have various causes such as electromagnetic influences, alpha-particles or neutrons.

The emphasis in error handling in communications systems is even presently on transient errors. Conventionally, when an error is detected in communications systems (e.g., in a controller area network, CAN), the erroneously transmitted data are resent. Furthermore, conventionally, the error counter is used in communications systems, the error counter being incremented on detection of an error, decremented when there is a correct transmission, and preventing transmission of data as soon as it exceeds a certain value.

In the case of computing hardware for running computer programs, however, error handling is performed generally only for permanent errors. Taking transient errors into account is limited to incrementing and, if necessary, decrementing an error counter. This counter reading is stored in a memory and may be read out off-line, i.e., as diagnostic or error information during a visit to a repair shop, e.g., in the case of computing hardware designed as a vehicle control unit. Only then is it possible to respond appropriately to the error.

Error handling via error counters thus, on the one hand, does not allow error handling within a short error tolerance time, which is necessary in particular for safety-relevant systems, and also, on the other hand, does not allow constructive error handling in the sense that the computer program is being run again properly within the error tolerance time. Instead, in the related art, the computer program is switched to emergency operation after exceeding a certain value on the error counter. This means that a different part of the computer program is run instead of the part containing the error, and the substitute values determined in this way are used for further computation. The substitute values may be modeled on the basis of other quantities, for example. Alternatively, the results calculated using the part of the computer program containing the error may be discarded as defective and replaced by standard values that are provided for emergency operation for further calculation. The conventional methods for handling a transient error of a computer program running on computing hardware thus do not allow any systematic constructive handling of the transient nature of most errors.

Also, conventionally, transient errors occurring in running a computer program on computing hardware are eliminated by completely restarting the computing hardware. This approach is also not actually satisfactory, because quantities obtained in processing of the computer program to that point are lost and the computing hardware is unable to fulfill its intended function for the duration of the restart. This is unacceptable in the case of safety-relevant systems in particular.

Finally, conventionally, for error handling for transient errors of a computer program run on computing hardware, the computer program may be set back by a few clock pulses and individual machine instructions of the computer program may be repeated. This method is also known as micro-rollback. With the conventional method, the system only returns by objects on a machine level (clock pulses, machine instructions). This requires appropriate hardware support on a machine level, which is associated with a considerable complexity in the area of the computing hardware. It is impossible for the conventional method to be executed exclusively under software control.

The conventional error handling mechanisms are unable to respond in a suitable manner to transient errors occurring in running a computer program on computing hardware.

SUMMARY

An object of the present invention is to provide a constructive means of handling transient errors in running a computer program on computing hardware in such a way that the full functionality and functional reliability of the computer system are restored within the shortest possible error tolerance time.

To achieve this object, starting from a method of the type mentioned at the outset, when an error is detected, at least one program object that has already been sent for execution is set to a defined state and started up again from this state.

It is not necessary for the program object that is restarted to have been executed completely on detection of the error. In the sense of the present invention, program objects whose execution has already begun but is not yet complete at the point in time of error detection may also be restarted when an error occurs. According to an embodiment of the present invention, when a transient or permanent error occurs, at least one operating system object is executed again. The advantages compared to the micro-rollback include in particular the fact that repetition of a program object is implementable using very little hardware support. At most, additional memory capacity is needed to be able to store some information (e.g., input quantities of the program object) required for renewed execution of the program object. The actual administration of the method according to the present invention may be performed by the operating system of the computing hardware. In other words, the method according to the present invention is implementable using traditional commercial processors without requiring additional hardware. However, it is of course also possible to implement the method according to the present invention by using hardware support.

Error detection itself may be accomplished by any method. It is possible to use any type of error detection mechanism capable of detecting errors during running of a computer program (known as concurrent checking). In a dual-core architecture, for example, the entire computer core may be designed in duplicate. If the computer cores are operated in a lock-step mode, it is possible to determine by comparison for each instruction whether both computer cores are supplying the same result. A difference in results would then definitely indicate an error. This error detection mechanism thus detects errors in real time during the execution of program objects. The situation is similar with error detecting codes which are used throughout the processor architecture or with duplicated subcomponents of the computing hardware. All these error detection mechanisms have in common the fact that they detect transient errors very rapidly and supply an error signal when an error has been detected.

In response to such an error signal, an error handling mechanism that repeats the program object may be triggered. If the same error occurs again when execution is repeated, a permanent error may be inferred or an error counter may be incremented, a permanent error being inferred only when a certain value is exceeded. However, if the error no longer occurs in renewed execution of the program object, it may be assumed that the error was a transient error. Even during renewed error-free execution of the program object, the computer program is again ready for its intended function. Availability is thus restored again after a very short period of time. Repetition of at least one program object is thus a good means for handling transient errors.

According to an advantageous refinement of the present invention, the program objects are designed as runtime objects (hereinafter referred to as tasks) of the computer program, at least one task being executed again on detection of an error. A task is a typical object on the operating system level. A task may be repeated with minimal effort or even under the exclusive control of the software, if desired.

According to a preferred specific embodiment of the present invention, a program object, which is executed at the point in time of the detection of the error, is restarted. Alternatively or additionally, however, program objects that had already been executed completely at the point in time of the detection of the error may also be restarted and executed again.

According to the present invention, during execution of the program objects, in particular at the start of execution of the program objects, at least one defined status of the program objects is generated and saved. This may be accomplished, for example, by saving the values of all variables relevant for the status of the program object.

In addition, another piece of computing hardware, operating as a redundant system to the computing hardware on which the computer program having the multiple program objects is executed, is used for error detection. More than one piece of redundant computing hardware may of course also be used for error detection.

The method according to the present invention is advantageously used in a motor vehicle, in particular a motor vehicle control unit, to ensure a secure and reliable run of the computer program despite unavoidable transient errors in running a computer program. This may be important in particular in running control programs and/or regulating programs in safety-critical applications in a motor vehicle.

It is also proposed that a permanent error be inferred if the same error occurs again in renewed execution of the at least one program object. It is also possible for a permanent error to be inferred only when the error occurs repeatedly after a preselectable number of repetitions of the program object. In this case, a transient error is inferred even if it fails to occur only after a third repetition or an even later repetition of the program object. In this refinement of the present invention, important program objects may thus be repeated, for example, three times instead of only twice.

According to another advantageous refinement of the present invention, the number of repetitions of the at least one program object is limited to a preselectable value. This prevents the same program object from being repeated indefinitely in the case of a permanent error. The number of repetitions of the at least one program object may be limited, for example, by using a counter or based on time limits. Furthermore, the specification of the task-dependent repetition value allows for important tasks to be repeated more often than less important tasks and thus important tasks are given an opportunity more often and/or for a longer period of time to run error-free without transient errors, whereas a permanent error may be inferred relatively rapidly in the case of less important tasks, and another system response may be initiated.

According to another preferred specific embodiment of the present invention, the number of repetitions of the at least one program object is limited dynamically to a preselectable value. The number of repetitions of the at least one program object is advantageously limited dynamically to a preselectable value as a function of a remaining time for scheduling. In this way, a first task and a second task, for example, may be run through while a third task may be repeated several times.

To implement an example method according to the present invention, during running of the computer program before the execution of a program object, the values of the quantities required for execution of the program object and/or the quantities that define the status of the program object are saved. Thus, according to this specific embodiment, the quantities of all program objects are saved.

Alternatively, in the case of a computer program to be processed periodically in a period, on detection of an error in a certain program object, the processing jumps back to a preselectable return point in the period of the computer program. Thus, according to this specific embodiment, in the case of an error, the program always jumps back to the same point within the period. Then preferably the values of all quantities relevant for the status of the program object are saved during running of the computer program only before the execution of a program object at the return point. In this way, only the values of the relevant quantities of the program object at the return point need be stored only once per cycle or period. Therefore, this allows savings in time for storing and memory capacity.

In renewed execution of a program object after detection of an error, the saved input quantities are then retrieved and made available as input quantities to the program object to be executed again.

As another specific embodiment of the present invention, multiple return points may be provided for one program object. When an error occurs, it is not necessary to execute the entire program object again, but instead only a portion of the program object need be executed. When an error occurs, the execution simply jumps back to the previous return point up to which the execution of the program object was free of errors. For example, in error-free running of the program object up to the n-th return point, it is possible to return to the n-th return point when an error occurs between the n-th return point and the (n+1)-th return point. The program object is then executed anew starting with the n-th return point. This permits time savings. When each return point is passed, at least one defined state is generated and saved, preferably during the execution of the program object.

Implementation of the method according to the present invention in the form of an operating system is of particular importance. The operating system here is capable of running on computing hardware, in particular on a microprocessor, and is programmed for execution of the method according to the present invention when it is running on the computing hardware. In this case, the present invention is thus implemented by the operating system, so this operating system constitutes the present invention in the same way as does the method for the execution of which the operating system is suitable. The operating system is preferably stored in a memory element and is transmitted to the computing hardware for processing. In particular any data medium or an electronic memory medium may be used as the memory element, e.g., a random access memory (RAM), a read-only memory (ROM) or a flash memory.

Based on the computing hardware of the type mentioned at the outset, another means of achieving the object of the present invention is for the computing hardware to have an error handling mechanism which prompts renewed execution of at least one program object on detection of an error by the error detection mechanism.

According to an advantageous refinement of the present invention, the error handling mechanism has a trigger logic which restarts the at least one program object on detection of an error.

According to a preferred specific embodiment, a real-time operating system, e.g., OSEK time, is running on the computing hardware. Finally, the present invention provides for the computing hardware to include a microprocessor.

DETAILED DESCRIPTION OF EXAMPLE EMBODIMENTS

The present invention relates to a method for running a computer program on computing hardware, in particular on a microprocessor. The computer program includes a plurality of program objects preferably designed as tasks. In this method, errors are detected during the running of the computer program on the computing hardware. The detected errors may be transient or permanent.

Transient errors may occur in running a computer program on computing hardware. Since structures on the semiconductor modules (so-called chips) in computing hardware are becoming progressively smaller, but the clock rate of the signals is becoming progressively higher and the signal voltages have become progressively lower, transient errors are occurring with ever greater frequency in running a computer program on computing hardware. In contrast with permanent errors, they occur only temporarily and they usually disappear spontaneously after a period of time. In transient errors, only individual bits are faulty and there is no permanent damage to the computing hardware. Transient errors may have various causes, e.g., electromagnetic effects, alpha-particles or neutrons.

On the basis of the fact that transient errors occur almost unforeseeably and therefore are not reproducible, error handling is therefore performed generally only for permanent errors in the computing hardware known from the related art. Taking into account transient errors is limited to incrementation and, possibly, decrementation of an error counter. This count is stored in a memory and may be read out off-line, i.e., as diagnostic information or error information during a visit to the repair shop, for example. Only then is it possible to respond appropriately to the error. The conventional error handling thus does not allow any error handling within a short error tolerance time, which is necessary for safety-relevant systems in particular and also does not allow constructive error handling in the sense that the computer program resumes proper processing within the error tolerance time and the computing hardware is able to fulfill its intended purpose.

Figure 1:
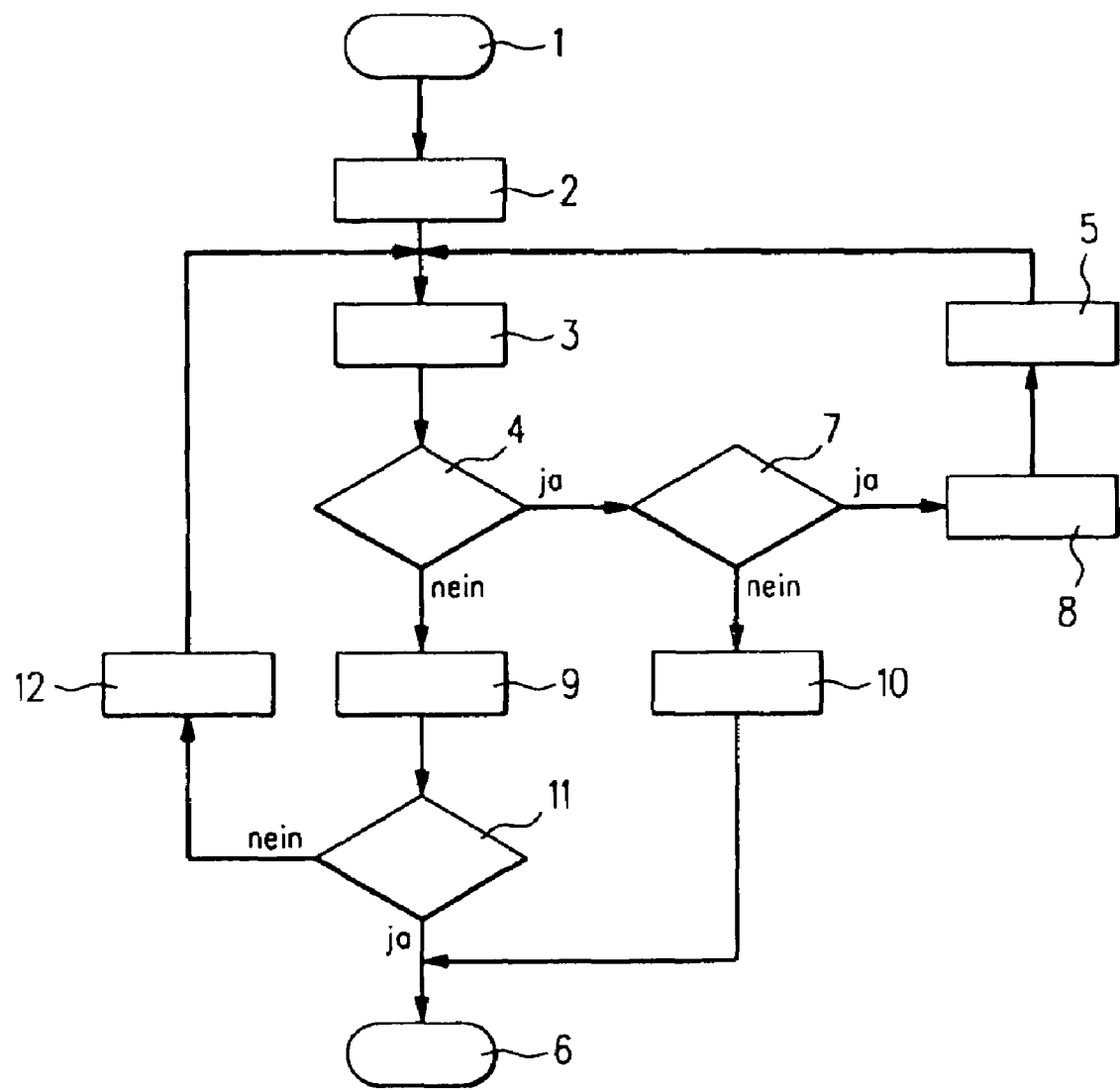
FIG. 1 shows a flow chart of an method according to the present invention according to a preferred specific embodiment.

In contrast, the example method according to the present invention allows handling of a transient error of a computer program running on computing hardware using a systematic constructive means of handling the transient nature of most errors. FIG. 1 shows a flow chart of the method according to the present invention using the example of a runtime object, also called a task. The existence of other tasks does not affect the basic workflow, so they need not be taken into account. Thus, according to the present invention, multiple tasks may be handled just as one task is handled according to the workflow depicted in FIG. 1. An error detection mechanism (so-called concurrent checking) operating in parallel is particularly advantageous. However, this is not presentable in a flow chart in this way but instead is inserted as a serial module at the particular location.

The method according to the present invention begins in a function block 1. The execution of the task on the computing hardware starts in function block 1. The task is called. In a function block 2, a return point is generated. To this end, reliable, relevant task input quantities sufficient for setting the task in a defined state for a restart and restarting the task are saved in a memory element in the computing hardware. All the input quantities of the task are preferably saved. The task is then executed further in a function block 3. The execution may proceed either to another return point or to the end of the task. An error detection mechanism is then executed. Error detection may occur according to any method. Errors are detected during the running of the computer program (so-called concurrent checking). Thus, with a so-called dual-core architecture, for example, the entire computer core is designed in duplicate. If the computer cores are operated in a so-called lock-step mode, it is possible to compare whether both computer cores deliver the same results for each instruction. A difference in results then allows an error to be inferred with certainty. Such an error detection mechanism thus detects errors during execution of the task in real time. The situation is also similar for error detecting codes which are used throughout the processor architecture or even for duplicated subcomponents of the computing hardware. Such error detection mechanisms that detect transient errors very rapidly and supply an error signal when an error has been detected are preferred.

A query block 4 checks on whether an error, i.e., a transient error or a permanent error, has been detected. If an error has been detected, another query block 7 branches off where the current value of an error counter logic is checked. If the error counter has not yet fallen below a preselectable counter reading (in the case of a decrementing error counter) or exceeded it (in the case of an incrementing error counter), then it is possible to repeat the execution of the task during the execution of which the error has occurred and/or a certain number of tasks executed before the error occurred. If a renewed startup of the execution of the task is possible, then the system branches off into a function block 8, where the status of the error counter logic is updated (decremented or incremented) with the information that another error has occurred. From there, the system branches off into a function block 5, in which the quantities stored in function block 2 are loaded and sent to the task for generating a defined status at the beginning of the execution. The system then branches off into a function block 3, where the task to be repeated is executed again in part, i.e., starting from a return point that has already been executed, for example, or as a whole, i.e., the task is restarted from the beginning.

If it is found in query block 4 that no error has occurred during execution of the task in function block 3, then the system branches off into a function block 9 in which the status of the error counter logic is updated with the information that no error has been detected. From that point forward, the system branches off at a query block 11 which verifies whether the computer program has been run to the end. If this is the case, then the system branches off to the end of the computer program in function block 6. Otherwise it branches off into a function block 12, where another return point is generated, depending on the current task status, by defining and saving reliable, relevant task input quantities sufficient for restarting the task. From that point forward, the system branches back into function block 3, where the task to be repeated is restarted and executed again either in part or in its entirety.

If it is found in query block 7 that another attempt at renewed execution of the task is no longer possible because of the reading on the error counter logic, then the system branches off into a function block 10. Query block 7 verifies whether the error counter logic value for this task is greater than a task-dependent repetition value. This task-dependent repetition value may be predetermined either as the same for different tasks or individually for each task. It is possible in this way for particularly important tasks, for example, to first be repeated several times before a permanent error is reported. If the task-dependent repetition value is preselected as 1, the task is repeated only once before a permanent error is detected. If the task-dependent repetition value is preselected as 2 or 3, the task is repeated two or three times before a permanent error is detected. In this case, the task thus has a longer period of time or more run-throughs available, until the transient error no longer occurs. In function block 10, a permanent error is then detected and a corresponding measure is initiated. This measure may include, for example, setting the computer program to an emergency mode or initially not undertaking anything and then terminating the run of the computer program.

The example method according to the present invention need not necessarily include all the function blocks and query blocks shown in FIG. 1 and explained above. Thus, for example, blocks 7 through 9, which involve the error counter logic, may be omitted. On detection of an error, the task(s) to be restarted and executed would then be repeated until the error no longer occurs. A permanent error would not be detected, so function block 10 could also be omitted. Alternatively, the task-dependent repetition value may be preselected as 1, so that function blocks 8 and 9 for updating the error counter could be omitted. Finally, it is also possible to omit blocks 11 and 12 if only a single task having a single return point is executed.

Figure 2:
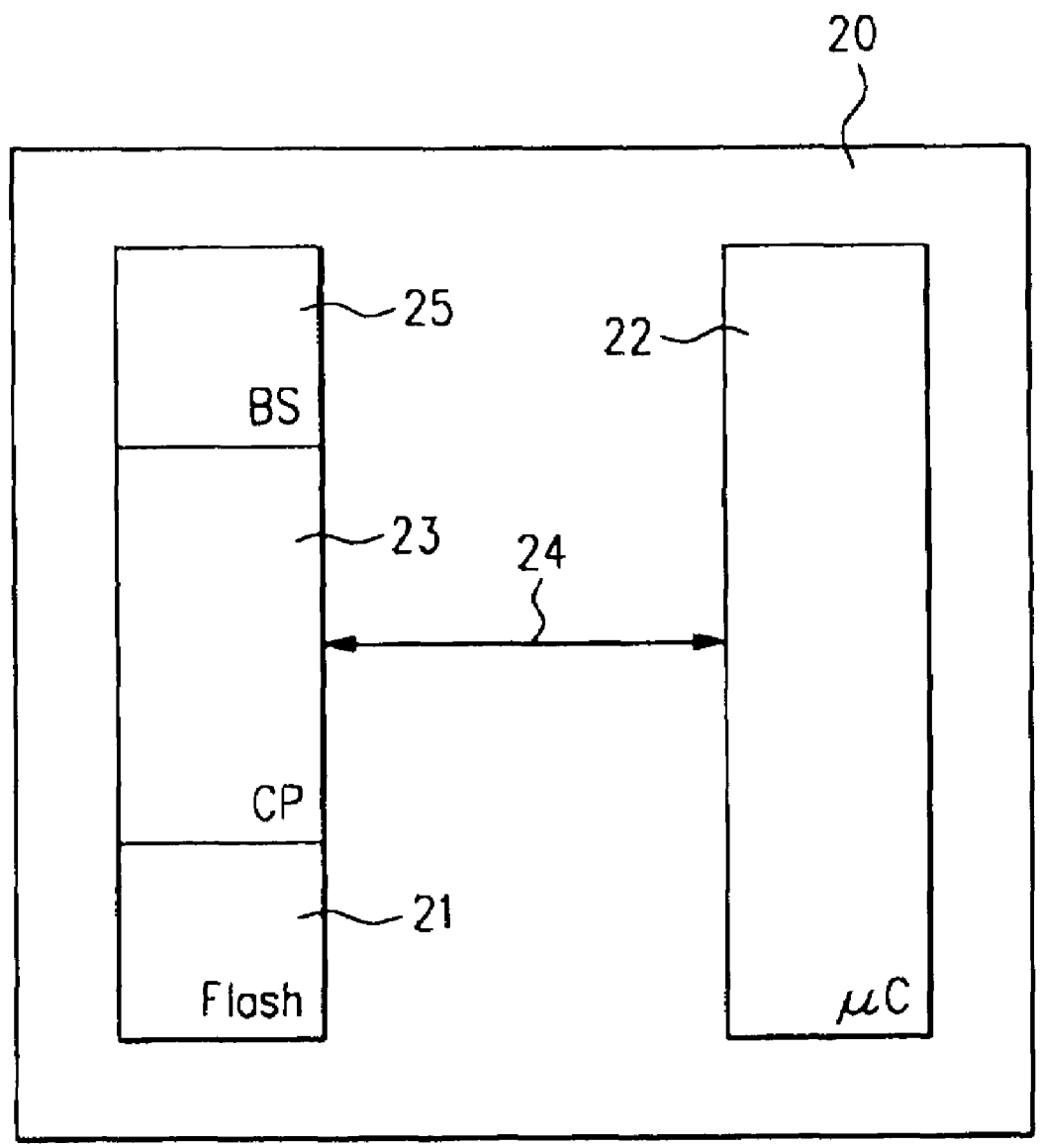
FIG. 2 shows a schematic diagram of a preferred specific embodiment of a computing hardware according to the present invention.

FIG. 2 shows an example piece of computing hardware according to the present invention for running a computer program according to a preferred specific embodiment. The computing hardware is labeled as 20 in its entirety. The computing hardware includes a memory element 21, designed as an electronic memory, in particular a flash memory, for example. Furthermore, computing hardware 20 includes a microprocessor 22 on which a computer program may be run.

The computer program is stored in electronic memory medium 21 and is labeled as 23. For running the computer program on microprocessor 22, the computer program is transmitted either as a whole or in segments, e.g., command by command to microprocessor 22 over a data link 24. Data link 24 may be designed as one or more data lines or as a bus system for data transmission. Furthermore, an operating system is stored in memory medium 21, which is transmitted at least partially from memory 21 to microprocessor 22 and run there when computing hardware 20 is booted up. The operating system is labeled as 25. It has the function of controlling and managing the running of computer program 23 on microprocessor 22 and the peripheral equipment connected to computing hardware 20. According to the present invention, operating system 25 is designed in a particular manner, so it is programmed for executing the method according to the present invention and executes the method according to the present invention when it runs on microprocessor 22. In particular, operating system 25 includes access to an error detection mechanism for detecting an error during running of computer program 23 on microprocessor 22. Furthermore, operating system 25 includes an error handling mechanism which prompts renewed execution of at least one program object (one task) of computer program 23 on detection of an error.

What is claimed is:

1. A method for running a computer program on computing hardware corresponding to a microprocessor, the computer program including multiple program objects, the method comprising:
   detecting errors while the computer program is running on the computing hardware; and
   when an error is detected, setting at least one program object that has already been sent for execution into a defined state and restarting the at least one program object from the defined state;
   wherein:
      a permanent error is inferred if the same error occurs again when the at least one program object is executed again;
      a number of repetitions of the at least one program object is limited to a preselectable value; and
      the number of repetitions of the at least one program object is dynamically limited to a preselectable value.

2. The method as recited in claim 1, wherein the program objects are designed as tasks of the computer program, and at least one task is executed again when an error is detected.

3. The method as recited in claim 1, wherein a program object being executed at the point in time of the detection of the error is executed again.

4. The method as recited in claim 1, wherein at least one defined state of the program objects is created and saved during execution of the program objects.

5. The method as recited in claim 1, wherein at least one defined state of the program objects is created and saved at a start of execution of the at least one program objects.

6. The method of claim 5, wherein an error-detection mechanism that operates in parallel to the execution of the at least one program object is used for the step of detecting errors, such that the restarting of the at least one program object from the defined state is performed prior to completion of the execution of the at least one program object.

7. The method as recited in claim 1, further comprising:
   using another piece of computing hardware operating as a redundant unit to the computing hardware for error detection.

8. The method as recited in claim 7, wherein the method is used in a motor vehicle control unit.

9. The method as recited in claim 1, wherein a permanent error is inferred if the same error occurs again when the at least one program object is executed again.

10. The method as recited in claim 9, wherein a number of repetitions of the at least one program object is limited to a preselectable value.

11. The method as recited in claim 1, wherein values of quantities required for executing the program object are saved during running of the computer program before execution of a program object.

12. The method as recited in claim 1, wherein the computing hardware jumps back to a certain program object at a preselectable return point in a period of the computer program when an error is detected in the computer program, the computer program being run periodically in a period.

13. The method as recited in claim 12, wherein, during the running of the computer program only before the execution of a program object at the return point, all input quantities applied to the program object are saved.

14. The method as recited in claim 13, wherein, during renewed execution of a program object after detection of an error, the program object is executed again using the input quantities saved for this program object.

15. A method for running a computer program on computing hardware corresponding to a microprocessor, the computer program including multiple program objects, the method comprising:
   detecting errors while the computer program is running on the computing hardware; and
   when an error is detected, setting at least one program object that has already been sent for execution into a defined state and restarting the at least one program object from the defined state;
   wherein:
      a permanent error is inferred if the same error occurs again when the at least one program object is executed again;
      a number of repetitions of the at least one program object is limited to a preselectable value; and
      the number of repetitions of the at least one program object is dynamically limited to a preselectable value as a function of a remaining time for scheduling.

16. The method as recited in claim 15, wherein at least one defined state is created and saved during execution of the at least one program object.

17. An electronic medium storing an operating system, the operation system capable of running a computer program on computing hardware corresponding to a microprocessor, wherein the operating system is programmed for executing a method comprising:
   detecting errors while the computer program is running on the computing hardware; and
   when an error is detected, setting at least one program object that has already been sent for execution into a defined state and restarting the at least one program object from the defined state;
   wherein:
      a permanent error is inferred if the same error occurs again when the at least one program object is executed again;
      a number of repetitions of the at least one program object is limited to a preselectable value; and
      the number of repetitions of the at least one program object is dynamically limited to a preselectable value.

18. Computing hardware for running a computer program including multiple program objects, comprising:
   an error detection mechanism adapted to detect an error during the running of the computer program on the computing hardware; and
   an error handling mechanism which, when an error is detected by the error detection mechanism, causes at least one program object that had already been sent for execution to be set into a defined state and restarted from the defined state;
   wherein:
      a permanent error is inferred if the same error occurs again when the at least one program object is executed again;
      a number of repetitions of the at least one program object is limited to a preselectable value; and
      the number of repetitions of the at least one program object is dynamically limited to a preselectable value.

19. The computing hardware as recited in claim 18, wherein the error handling mechanism has a trigger logic which restarts the at least one program object on detection of an error.

20. The computing hardware as recited in claim 19, wherein a real-time operating system runs on the computing hardware.

* * * * *